US010434578B2

(12) United States Patent
Lin et al.

(10) Patent No.: US 10,434,578 B2
(45) Date of Patent: Oct. 8, 2019

(54) DIRECT-DRIVE TWO-AXIS MACHINING HEAD

(71) Applicant: INDUSTRIAL TECHNOLOGY RESEARCH INSTITUTE, Hsin-Chu (TW)

(72) Inventors: Wei-Juh Lin, Taichung (TW); Jyun-Yu Chen, Taichung (TW); Wei-Tse Lin, Taichung (TW)

(73) Assignee: INDUSTRIAL TECHNOLOGY RESEARCH INSTITUTE, Hsin-Chu (TW)

( * ) Notice: Subject to any disclaimer, the term of this patent is extended or adjusted under 35 U.S.C. 154(b) by 0 days.

(21) Appl. No.: 15/836,092

(22) Filed: Dec. 8, 2017

(65) Prior Publication Data

US 2019/0126356 A1 May 2, 2019

(30) Foreign Application Priority Data

Oct. 26, 2017 (TW) .............................. 106136974 A

(51) Int. Cl.
*B23Q 1/00* (2006.01)
*B23Q 16/10* (2006.01)
(Continued)

(52) U.S. Cl.
CPC ............ *B23B 3/26* (2013.01); *B23F 23/1237* (2013.01); *B23Q 1/5406* (2013.01); *B23Q 5/10* (2013.01);
(Continued)

(58) Field of Classification Search
CPC .. B23Q 16/00; B23Q 5/04; B23C 7/00; B23C 1/12; Y10T 409/307616;
(Continued)

(56) References Cited

U.S. PATENT DOCUMENTS 5,584,621 A * 12/1996 Bertsche .............. B23Q 1/5406
409/201
5,664,470 A * 9/1997 Garnett ................ B23Q 1/0036
408/56
(Continued)

FOREIGN PATENT DOCUMENTS

CN 101011795 A 8/2007
CN 102091947 A 6/2011
(Continued)

OTHER PUBLICATIONS

Intellectual Property Office Ministry of Economic Affairs, R.O.C., Office Action, dated Apr. 11, 2018, Taiwan.
(Continued)

*Primary Examiner* — Nicole N Ramos
(74) *Attorney, Agent, or Firm* — Locke Lord LLP; Tim Tingkang Xia, Esq.

(57) ABSTRACT

A direct-drive two-axis machining head includes a head-drive unit and a shaft-drive unit. The head-drive unit includes a head-installing interface, a first motor, an axis-A supporter, and a first brake mounted at an outermost rim of either a first motor seat or a stator of the first motor for braking the axis-A supporter. The shaft-drive unit further includes an axis-A-installing interface, a second motor, a shaft connector, and a second brake mounted at an outermost rim of a second motor seat of the second motor for braking the shaft connector. The head-drive unit further includes a fixation sheet metal and a pipeline shield. The fixation sheet metal connects the rotor seat. One end of the pipeline shield connects the fixation sheet metal, while another end thereof connects the head-installing interface so as to shield a plurality of pipelines.

6 Claims, 5 Drawing Sheets

(51) Int. Cl.
*B23B 3/26* (2006.01)
*B23Q 5/42* (2006.01)
*B23Q 5/10* (2006.01)
*B23F 23/12* (2006.01)
*B23Q 1/54* (2006.01)
*B23Q 5/28* (2006.01)

(52) U.S. Cl.
CPC .............. *B23Q 5/42* (2013.01); *B23Q 16/10* (2013.01); *B23Q 1/0027* (2013.01); *B23Q 5/28* (2013.01); *B23Q 2220/006* (2013.01)

(58) Field of Classification Search
CPC ... Y10T 409/307672; Y10T 409/30784; Y10T 409/308232; Y10T 409/308512; Y10T 409/309296; Y10T 408/93
See application file for complete search history.

(56) References Cited

U.S. PATENT DOCUMENTS

| | | | |
|---|---|---|---|
| 5,996,329 A | | 12/1999 | Cardenas |
| 6,746,188 B2* | | 6/2004 | Watanabe ............... B23Q 1/70 409/201 |
| 7,938,603 B2* | | 5/2011 | Tatsuda ............... B23Q 1/0009 408/236 |
| 2003/0103826 A1* | | 6/2003 | Watanabe ............... B23Q 1/70 409/201 |
| 2010/0290854 A1* | | 11/2010 | Tatsuda ............... B23Q 1/5406 409/216 |
| 2010/0310335 A1* | | 12/2010 | Tatsuda ............... B23Q 1/5406 409/204 |
| 2012/0020754 A1* | | 1/2012 | Ou ............... B23Q 1/5406 409/201 |
| 2012/0121356 A1* | | 5/2012 | Tatsuda ............... B23Q 1/0018 409/201 |

FOREIGN PATENT DOCUMENTS

| | | |
|---|---|---|
| CN | 102699738 A | 10/2012 |
| CN | 104493277 A | 4/2015 |
| CN | 206286560 U | 6/2017 |
| KR | 20150116582 A | 10/2015 |
| TW | M380190 U | 5/2010 |
| TW | 201204489 A | 2/2012 |
| TW | I378842 B1 | 12/2012 |
| TW | I451936 B | 9/2014 |
| TW | M539418 U | 4/2017 |
| WO | 2009008285 A1 | 1/2009 |
| WO | 2009034030 A3 | 3/2009 |

OTHER PUBLICATIONS

Shiwei Hu et al., Direct-drive Bi-Rotary Milling Head Variable Load Thermal Characteristics Analysis, AASRI Procedia, 2012, vol. 3, pp. 270-276.

Shi Bo et al., Finite Element Static Stiffness Analysis of the A/C Axes Bi-rotary Milling Head, Advanced Materials Research, 2013, vols. 655-657, 1195-1199.

Ming Yuan Zhang et al., Modal and Twist Stiffness Analysis about Milling Head, Advanced Materials Research, 2013, vols. 677, 241-245.

Pengbing Zhao et al., Proportional-integralbased fuzzy sliding mode control of the milling head, Control Engineering Practice, vol. 53, 2016, pp. 1-13.

Jun Zhang et al., Rapid dynamics prediction of tool point for birotary head five-axis machine tool, Precision Engineering, vol. 48, 2017, pp. 203-215.

Kenji Shimana et al., Real-Time Estimation of Machining Error Caused by Vibrations of End Mill, Procedia CIRP, vol. 46, 2016, pp. 246-249.

Y. H. Sun et al., Thermal Characteristics Analysis of Mill Head of Five-Axis CNC Mill Machine Based on Finite Element Method, Applied Mechanics and Materials, 2014, vol. 446-447, 509-512.

\* cited by examiner

DIRECT-DRIVE TWO-AXIS MACHINING HEAD

CROSS REFERENCE TO RELATED APPLICATION

The present application is based on, and claims priority from, Taiwan (International) Application Serial Number 106136974, filed on Oct. 26, 2017, the disclosure of which is hereby incorporated by reference herein in its entirety.

TECHNICAL FIELD

The present disclosure relates in general to a two-axis machine head installed at a machine, and more particularly to a direct-drive two-axis machining head that can reduce the weight, optimize the arrangements of oil pipes, circuits and cutting fluids, and enhance the machinability.

BACKGROUND

Currently, the direct-drive two-axis machining heads have been widely applied to various machines, and a typical direct-drive two-axis machining head is generally consisted of a direct-drive motor, a head-installing interface, bearings, a shaft and a brake. However, since the direct-drive motor is usually disposed on a head-installing interface, so internal available space around the direct-drive two-axis machining head is comparatively limited for providing a sufficient room to arrange fluid, electric and gas pipelines. Hence, an additional fluid distributor is particularly applied to help the pipeline arrangement. Under such a circumstance, difficulty in arranging the pipelines would be revealed, and also the total weight of the machining head would become a problem to result in a poor performance of dynamic stiffness. Thereupon, quality in precision machining would be hard to achieve.

In view of the aforesaid disadvantage of the poor dynamic stiffness in the conventional direct-drive two-axis machining head, a corresponding improvement upon the direct-drive two-axis machining head in the spatial arrangement would be urgent and definitely welcome to the art.

SUMMARY

In this disclosure, a direct-drive two-axis machining head includes a head-drive unit and a shaft-drive unit. The head-drive unit further includes a head-installing interface having therebeneath a first motor seat, a first motor having a stator mounted at the first motor seat and a rotor mounted at a rotor seat, an axis-A supporter connecting the rotor seat, and a first brake mounted at an outermost rim of either the first motor seat or the stator of the first motor for braking the axis-A supporter. The shaft-drive unit further includes an axis-A-installing interface having thereaside a second motor seat, a second motor mounted at the second motor seat, a shaft connector for mounting a shaft and being driven by the second motor, and a second brake mounted at an outermost rim of the second motor seat for braking the shaft connector.

Further scope of applicability of the present application will become more apparent from the detailed description given hereinafter. However, it should be understood that the detailed description and specific examples, while indicating exemplary embodiments of the disclosure, are given by way of illustration only, since various changes and modifications within the spirit and scope of the disclosure will become apparent to those skilled in the art from this detailed description.

BRIEF DESCRIPTION OF THE DRAWINGS

The present disclosure will become more fully understood from the detailed description given herein below and the accompanying drawings which are given by way of illustration only, and thus are not limitative of the present disclosure and wherein.

DETAILED DESCRIPTION

Figure 1:
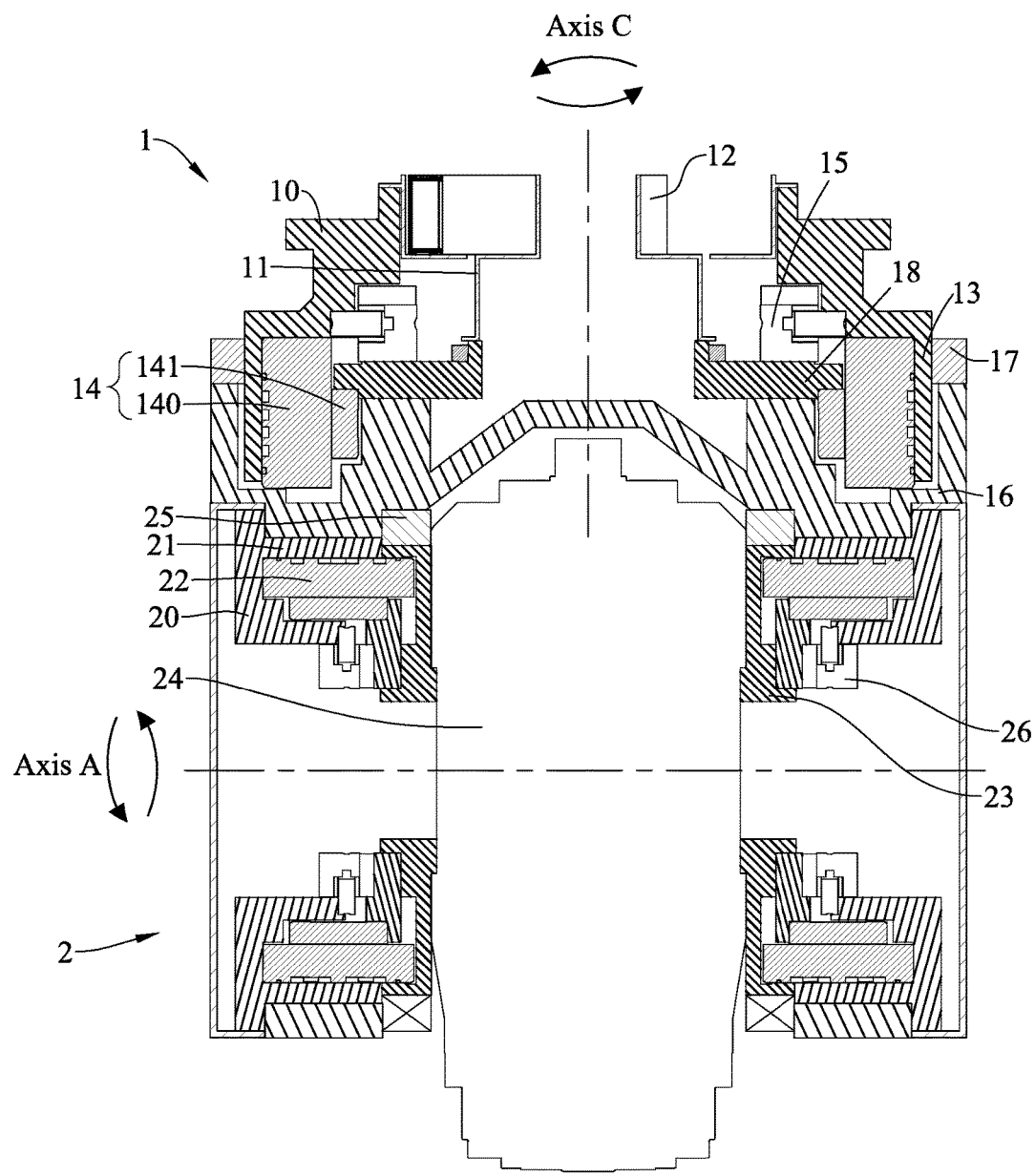
FIG. 1 is a schematic cross-sectional view of a preferred direct-drive two-axis machining head in accordance with this disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Referring now to FIG. 1, the direct-drive two-axis machining head in this disclosure is mainly consisted of a head-drive unit 1 and a shaft-drive unit 2, and disposed fixedly to a machine by a head-installing interface 10.

The head-drive unit 1 includes mainly the head-installing interface 10, a fixation sheet metal 11, at least one pipeline shield 12, a first motor seat 13, a first motor 14, a first bearing 15, an axis-A supporter 16 and a first brake 17.

The tube-like fixation sheet metal 11 is disposed under an inner space of the head-installing interface 10. Referring to both FIG. 1 and FIG. 2, the pipeline shield 12 is disposed on an end (top end in FIG. 1) of the fixation sheet metal 11 so as to shield pipelines of oils, electricity, gases and cutting fluids. One end of the pipeline shield 12 is connected with the fixation sheet metal 11, while another end thereof is fixed to an inner rim of the head-installing interface 10. Since the head-installing interface 10 is locked to the machine, thus the pipeline shield 12 would move and/or rotate in the inner space with the fixation sheet metal 11, such that the pipelines therearound would not be intertwined. In the inner space of the head-installing interface 10, other components, other than the fixation sheet metal 11 and the pipeline shield 12, can be located thereinside according to practical needs.

The first motor seat 13, disposed under the head-installing interface 10, is to mount a stator 140 of the first motor 14, and rotors 141 of the first motor 14 are mounted by the rotor seat 18. The rotor seat 18 is further connected with the fixation sheet metal 11 so as to turn the fixation sheet metal 11. The first bearing 15 is located between a lower rim of the head-installing interface 10 and the rotor seat 18; i.e., the first motor 14 is disposed under the first bearing 15.

The axis-A supporter 16 is disposed under a bottom of the first motor seat 13, and connected with the rotor seat 18. Thus, the axis-A supporter would be driven by the first motor 14 to rotate about a C axis (as a center axis). In addition, a bottom of the axis-A supporter 16 is connected with the shaft-drive unit 2.

The first braking module 17 is disposed to an outermost rim of the head-installing interface 10 or the first motor seat 13. Namely, the first brake 17 is purposely disposed to the outermost rim of the stator 140 of the first motor 14 so as to receive a foreign control for braking the rotation of the axis-A supporter 16; i.e., to stop the motions of the shaft-drive unit 2 about the C axis. Since the first brake 17 is mounted at the outermost position, so that a larger braking torque can be provided to the first brake 17.

The shaft-drive unit 2 includes mainly an axis-A-installing interface 20, a second motor seat 21, a second motor 22, a shaft connector 23, an electrospindle 24, a second brake 25 and a second bearing 26. The shaft-drive unit 2 is connect with a bottom of the axis-A supporter 16 via the axis-A-installing interface 20 or the second motor seat 21.

The axis-A-installing interface 20 is directly connected with the bottom of the axis-A supporter 16, and the second motor seat 21 is disposed laterally to the axis-A-installing interface 20 so as to mount the second motor 22 (shown by a stator in the figure).

The shaft connector 23, used for mounting the electrospindle 24, is driven by the second motor 22. Pipelines of motor circuits, cutting fluids, lubrication oils, and pneumatic loops for the shaft-drive unit 2 and the electrospindle 24 are drawn out to the pipeline shield 12 via a hole (not shown in the figure) of the head-drive unit 1. These pipelines is located inside the head-drive unit 1 and is shielded and fixedly by the pipeline shield 12.

The second brake 25 is disposed between the second motor seat 21 and the shaft connector 23, either at the outermost periphery of the shaft connector 23 or at the outermost rim of the second motor seat 21. Similarly, upon such an arrangement, the second brake 25 can gain a larger braking torque to brake the shaft connector 23; namely, to stop the motions of the shaft-drive unit 2 about the A axis.

The second bearing 26 is disposed between the second motor seat 21 and the shaft connector 23. In this disclosure, each of the first bearing 15 and the second bearing 26 can be an axial/radial bearing.

Figure 2:
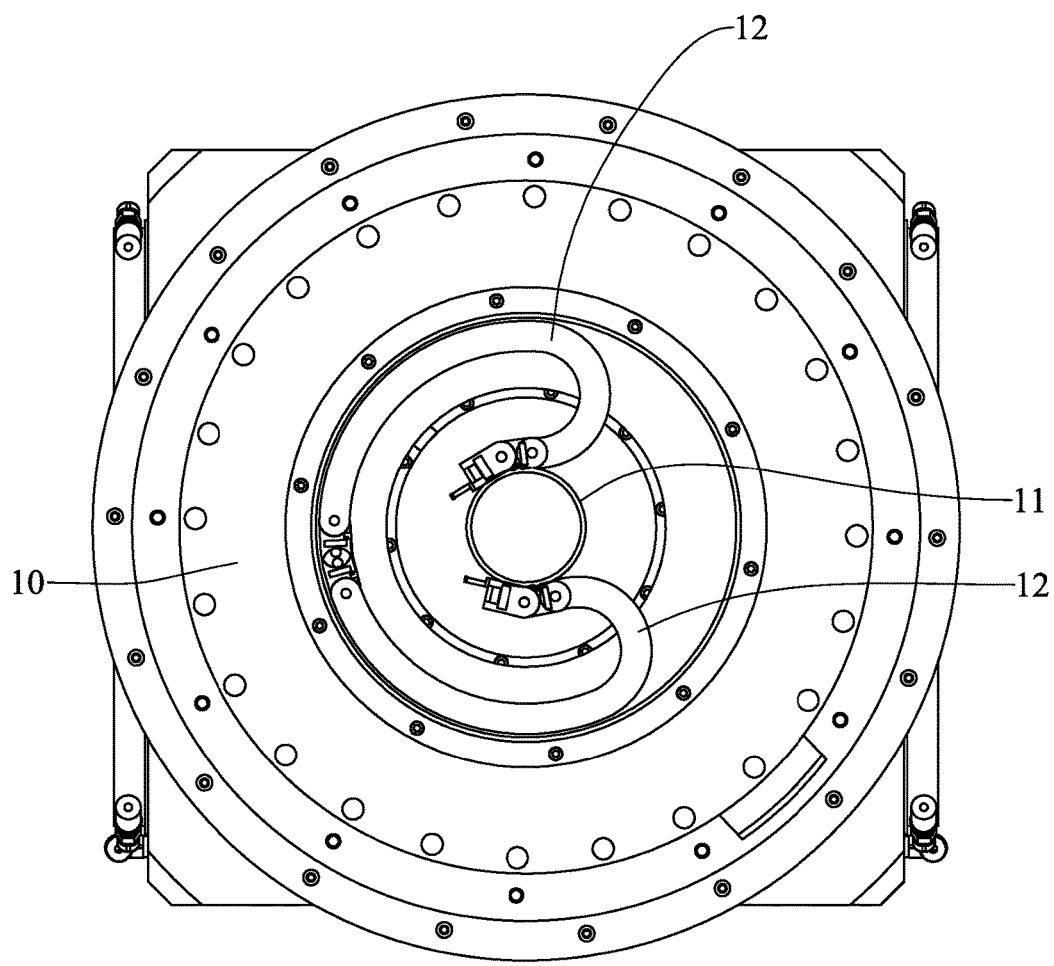
FIG. 2 is a schematic top view of FIG. 1.

As shown in FIG. 1 and FIG. 2, the head-installing interface 10 can be fixed onto an installation surface of the machine by a plurality of screw bolts. For example, in the case that the machine is a gantry-type machine or a horizontal machine, then the installation surface can be a machine head of the gantry-type machine or a W-axis headstock of the horizontal machine, respectively.

The first motor 14 drives the axis-A supporter 16 to rotate, and the driven axis-A supporter 16 further drives the shaft connector 23. Then, the driven shaft connector 23 further drives the electrospindle 24, and thus the electrospindle 24 can undergo ±360° rotation about the C axis. To stop the rotation of the electrospindle 24, the first motor 14 stops driving the axis-A supporter 16 firstly, and then the first brake 17 brakes the axis-A supporter 16, such that the electrospindle 24 can stop the rotation about the C axis.

The first brake braking module 17 is disposed between the head-installing interface 10 or the first motor seat 13 and the axis-A supporter 16. Preferably, the first brake 17 is located at an outermost rim of the stator 140 of the first motor 14, so that an effective braking torque can be significantly increased.

The second motor 22 drives the shaft connector 23, and then the driven shaft connector 23 would allow the electrospindle 24 to undergo an ±110~120° rotation. In the case of stopping the rotation of the electrospindle 24, the second motor 22 is firstly to stop driving the shaft connector 23, and then the second brake 25 brakes the shaft connector 23 to stop, so that the electrospindle 24 can stop the rotation about the A axis.

The second brake 25 is disposed between the second motor seat 21 and the shaft connector 23. Preferably, the second brake 25 is located at the outermost rim of the stator of the second motor 22, so that the effective braking torque can be significantly increased.

By providing the aforesaid direct-drive two-axis machining head of the present disclosure, advantages in less weight, better machinability and longer lifespan of pipelines can be obtained. If an acting force is applied to each axial direction of the direct-drive two-axis machining head (for example, 1000 N in each of the X-axis direction, the Y-axis direction and the Z-axis direction), it is found that the compliance, or the inverse of the dynamic stiffness, of the direct-drive two-axis machining head of the present disclosure is raised at least by 4% in the X-axis direction, 18% in the Y-axis direction, and 18% in the Z-axis direction.

Figure 3:
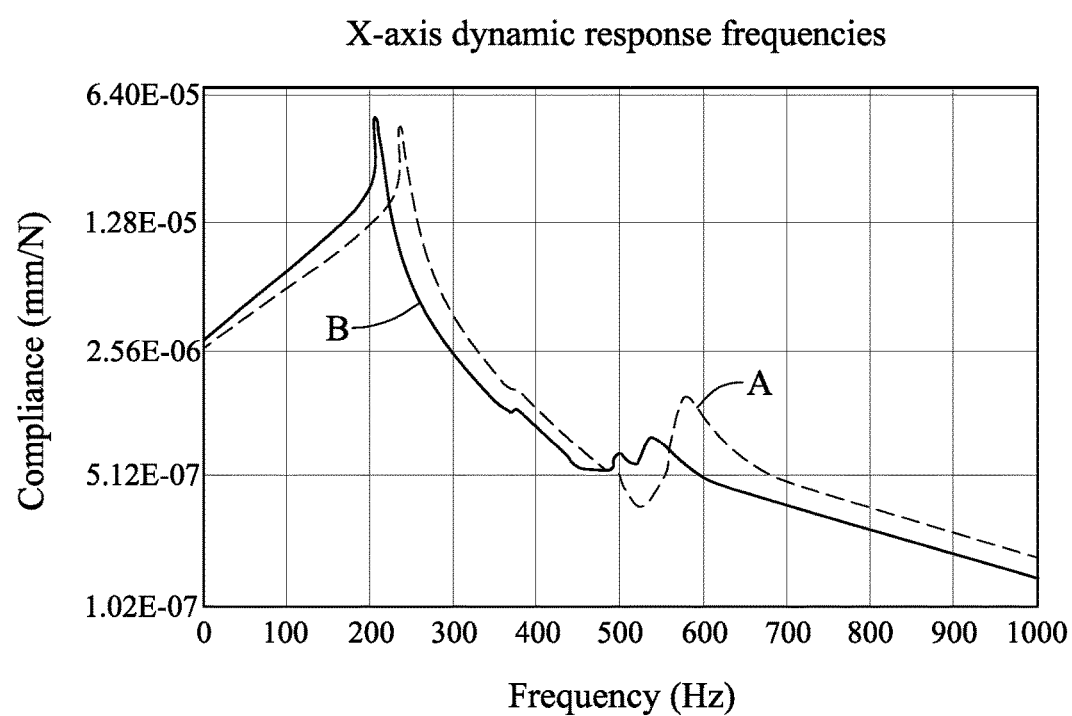
FIG. 3 is a schematic plot to demonstrate X-axis dynamic response frequencies for the direct-drive two-axis machining head of FIG. 1.

Referring now to FIG. 3, a schematic plot of X-axis dynamic response frequencies for the direct-drive two-axis machining head of FIG. 1 is demonstrated. As shown, curve A (dashed line) stands for variations of the X-axis dynamic response frequency with respect to the frequency for the direct-drive two-axis machining head of this disclosure. Curve B (solid line) stands for variations of the X-axis dynamic response frequency with respect to the frequency for the direct-drive two-axis machining head in the art. By observing FIG. 3, it is found that the dynamic stiffness of this disclosure is increased by at least 11.5% in comparison with that of the prior art.

Figure 4:
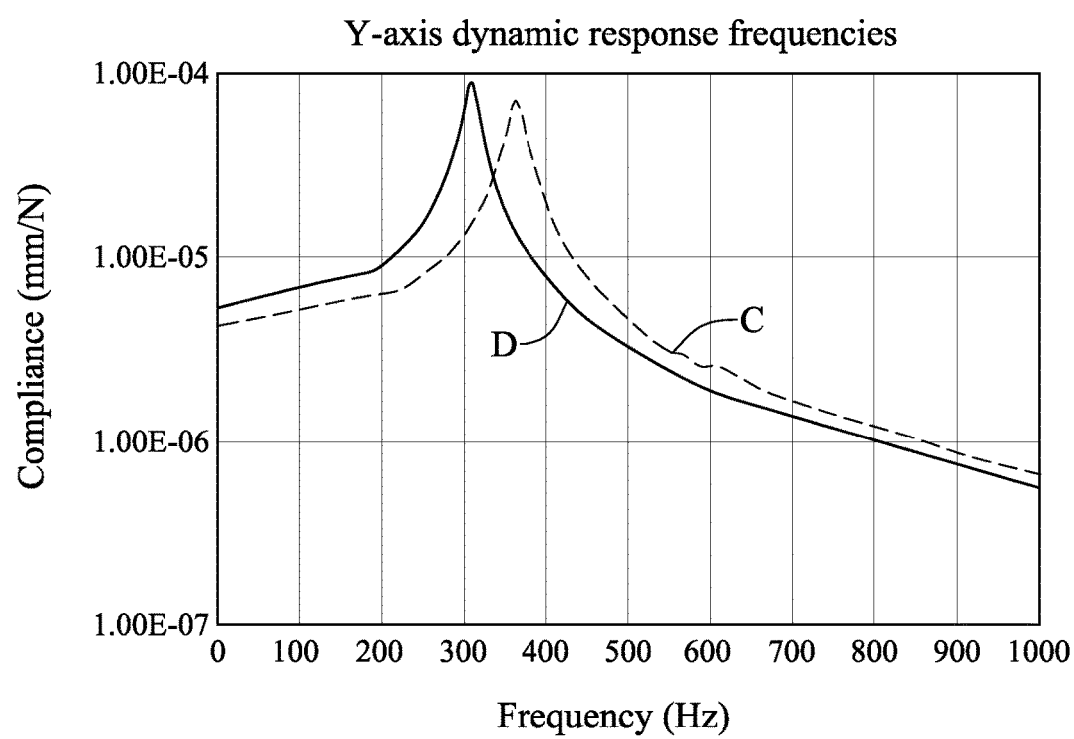
FIG. 4 is a schematic plot to demonstrate Y-axis dynamic response frequencies for the direct-drive two-axis machining head of FIG. 1.

Referring now to FIG. 4, a schematic plot of Y-axis dynamic response frequencies for the direct-drive two-axis machining head of FIG. 1 is demonstrated. As shown, curve C (dashed line) stands for variations of the Y-axis dynamic response frequency with respect to the frequency for the direct-drive two-axis machining head of this disclosure. Curve D (solid line) stands for variations of the Y-axis dynamic response frequency with respect to the frequency for the direct-drive two-axis machining head in the art. By observing FIG. 4, it is found that the dynamic stiffness of this disclosure is increased by at least 20.7% in comparison with that of the prior art.

Figure 5:
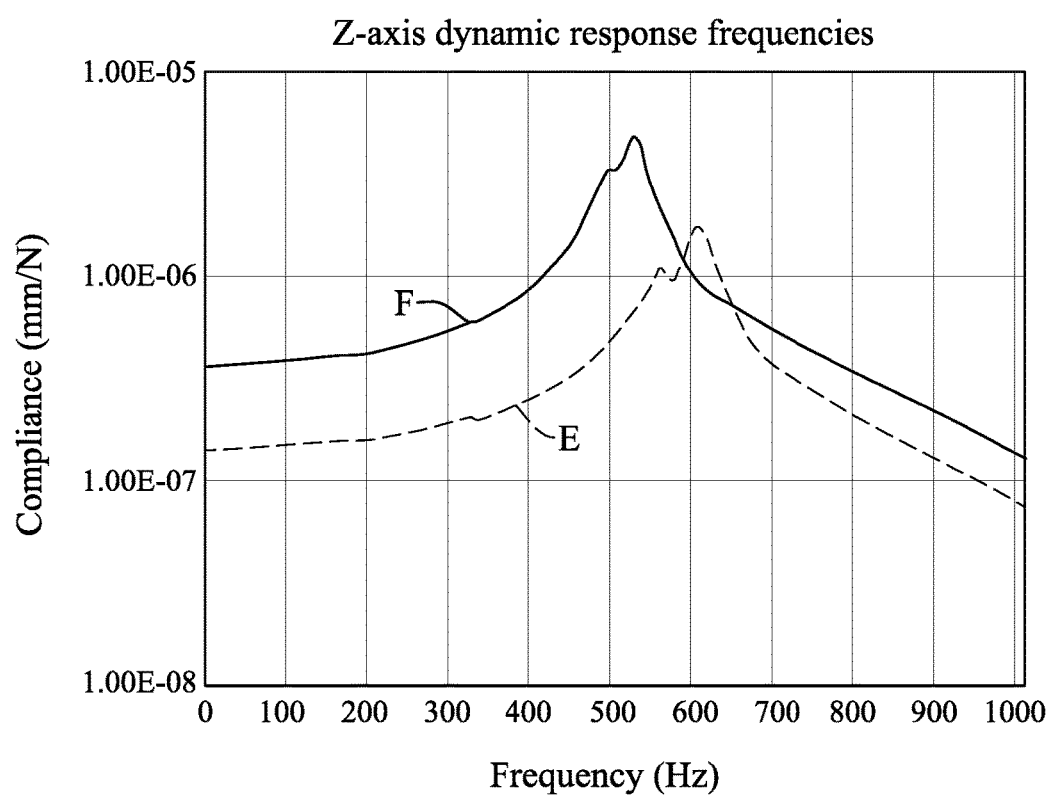
FIG. 5 is a schematic plot to demonstrate Z-axis dynamic response frequencies for the direct-drive two-axis machining head of FIG. 1.

Referring now to FIG. 5, a schematic plot of Z-axis dynamic response frequencies for the direct-drive two-axis machining head of FIG. 1 is demonstrated. As shown, curve E (dashed line) stands for variations of the Z-axis dynamic response frequency with respect to the frequency for the direct-drive two-axis machining head of this disclosure. Curve F (solid line) stands for variations of the Z-axis dynamic response frequency with respect to the frequency for the direct-drive two-axis machining head in the art. By observing FIG. 5, it is found that the dynamic stiffness of this disclosure is increased by at least 63.3% in comparison with that of the prior art.

In summary, the direct-drive two-axis machining head of this disclosure is featured in that: (a) a larger inner space can be obtained by disposing the first motor 14 under the head-installing interface 10 or the first bearing 15; (b) the fixation sheet metal 11 and the pipeline shield 12 are installed in the enlarged inner space so as able to arrange various pipelines adequately; and, (c) the first and second brakes 17, 25 are mounted to the corresponding outermost rims of the stators of the first and second motors 14, 22, respectively, so as to obtain larger braking torques.

Currently, since the motor of the conventional direct-drive two-axis machining head is disposed above the head-installing interface, the dimension and capacity of the motor are thus limited, various pipelines crowded in the narrow inner space would be vulnerable to unexpected damages, and also a stronger brake is needed due to a smaller braking torque. Hence, by providing the direct-drive two-axis machining head in accordance with this disclosure, the aforesaid shortcomings in the art can be effectively improved, the machinability can be enhanced, and thus requirements to be patented are fulfilled.

With respect to the above description then, it is to be realized that the optimum dimensional relationships for the parts of the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present disclosure.

What is claimed is:

1. A direct-drive two-axis machining head, comprising:
   a head-drive unit, including:
   a head-installing interface, locating therebeneath a first motor seat;
   a first motor, having a stator and a rotor; wherein the stator is mounted at the first motor seat, and the rotor is mounted at a rotor seat;
   an axis-A supporter, connecting the rotor seat; and
   a first brake, mounted at an outermost rim of the first motor seat for braking the axis-A supporter; and
   a shaft-drive unit, including:
   an axis-A-installing interface, having thereaside a second motor seat;
   a second motor, mounted at the second motor seat;
   a shaft connector, being to mount a shaft, driven by the second motor; and
   a second brake, mounted at an outermost rim of the second motor seat for braking the shaft connector;
   wherein the first brake is further located at an outermost rim of the stator of the first motor so that a large braking torque is provided to the first brake, and the second brake is further located at an outermost rim of a stator of the second motor so that a large braking torque is provided to the second brake.

2. The direct-drive two-axis machining head of claim 1, wherein the head-drive unit further includes a fixation sheet metal and a pipeline shield, the fixation sheet metal connects the rotor seat, and one end of the pipeline shield connects the fixation sheet metal, while another end thereof connects the head-installing interface so as to shield a plurality of pipelines.

3. The direct-drive two-axis machining head of claim 1, wherein the head-drive unit further includes a first bearing located between the head-installing interface and the rotor seat.

4. The direct-drive two-axis machining head of claim 3, wherein the first bearing is an axial/radial bearing.

5. The direct-drive two-axis machining head of claim 3, wherein the first motor is disposed under the first bearing.

6. The direct-drive two-axis machining head of claim 1, wherein the shaft-drive unit further includes a second bearing located between the second motor seat and the shaft connector.

* * * * *